United States Patent
Yoneoka

(10) Patent No.: US 8,040,534 B2
(45) Date of Patent: Oct. 18, 2011

(54) IMAGE PROCESSING METHOD AND APPARATUS COMPRISING AN IMAGE PROCESSING IN WHICH A RIP PROCESS IS PERFORMED ON ORIGINAL IMAGE DATA

(75) Inventor: Hideharu Yoneoka, Ami-machi (JP)

(73) Assignee: Riso Kagaku Corporation, Tokyo (JP)

( * ) Notice: Subject to any disclaimer, the term of this patent is extended or adjusted under 35 U.S.C. 154(b) by 1198 days.

(21) Appl. No.: 11/598,286

(22) Filed: Nov. 13, 2006

(65) Prior Publication Data

US 2007/0109583 A1 May 17, 2007

(30) Foreign Application Priority Data

Nov. 14, 2005 (JP) .................................. 2005-329456

(51) Int. Cl.
*G06K 15/00* (2006.01)

(52) U.S. Cl. ........ 358/1.12; 358/1.2; 358/1.18; 358/2.1; 358/3.12

(58) Field of Classification Search ........... 358/1.2–3.02
See application file for complete search history.

(56) References Cited

U.S. PATENT DOCUMENTS

| | | | |
|---|---|---|---|
| 5,838,333 A | | 11/1998 | Matsuo |
| 6,725,779 B2 * | | 4/2004 | Van de Velde et al. ....... 101/483 |
| 7,316,473 B2 * | | 1/2008 | Matsuzawa et al. .......... 347/100 |
| 2002/0097408 A1 * | | 7/2002 | Chang et al. .................. 358/1.6 |
| 2005/0116974 A1 * | | 6/2005 | Suzuki ............................ 347/10 |
| 2007/0109583 A1 * | | 5/2007 | Yoneoka ..................... 358/1.13 |

FOREIGN PATENT DOCUMENTS

| | | |
|---|---|---|
| JP | 5-233792 | 9/1993 |
| JP | 08-235346 | 9/1996 |
| JP | 9-149242 | 6/1997 |
| JP | 10-315449 | 12/1998 |
| JP | 10-336454 | 12/1998 |
| JP | 11-69163 | 3/1999 |
| JP | 2001-105663 | 4/2001 |
| JP | 2003-200613 | 7/2003 |
| JP | 2004-082488 | 3/2004 |

* cited by examiner

*Primary Examiner* — Benny Tieu
*Assistant Examiner* — Marcellus Augustin
(74) *Attorney, Agent, or Firm* — Brian M. McGuire; Matthew K. Ryan; Frommer Lawrence & Haug LLP

(57) ABSTRACT

An image processing method in which a RIP process is performed on original image data to obtain raster data with a first resolution, and a smoothing process is performed through oversampling the obtained raster data to generate output image data with a second resolution which is smaller than the first resolution. The method is performed for recording an image on a recording medium by an inkjet recording device that performs the recording by discharging an ink drop on the recording medium from an inkjet head based on the output image data. Here, the first resolution in the RIP process for performing the smoothing process on the raster data is determined according to information that indicates the number of gradations corresponding to the number of ink drops selected in advance and the second resolution.

8 Claims, 6 Drawing Sheets

FIG.2
| RESOLUTION IN RIP PROCESS (dpi) | TYPE OF PRINTING PAPER |
|---|---|
| 600 × 600 | HC PAPER (CHARACTER) |
| 600 × 900 | HC PAPER (PHOTOGRAPH), PLAIN PAPER, POSTCARD |
| 600 × 900 | HC MATTE, HIGH GRADE PAPER 1 |
| 600 × 1200 | INKJET POSTCARD, HIGH GRADE PAPER 2 |
FIG.3A
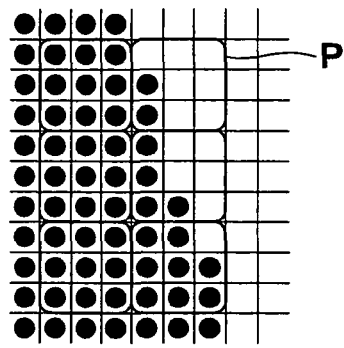
FIG.3B
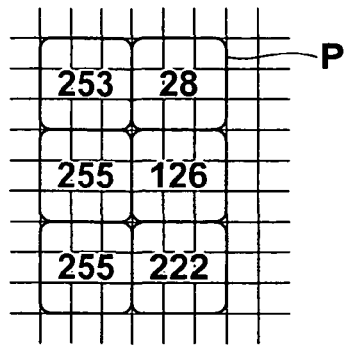
FIG.3C
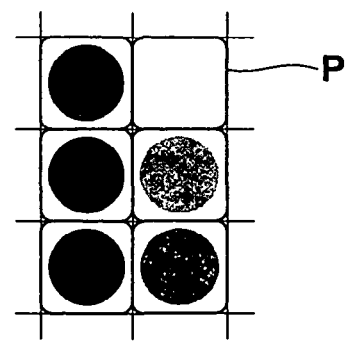

FIG.4

| RESOLUTION (MAIN × SUB) | | NUMBER OF INK DROPS | AMOUNT OF DATA | RESOLUTION IN RIP PROCESS (dpi) | TYPE OF PRINTING PAPER |
|---|---|---|---|---|---|
| 300 | 300 | 1 | 90000 | 600 × 600 | |
| 300 | 300 | 2 | 180000 | 600 × 600 | |
| 300 | 300 | 3 | 270000 | 600 × 600 | |
| 300 | 300 | 4 | 360000 | 600 × 600 | HC PAPER (CHARACTER) |
| 300 | 300 | 5 | 450000 | 600 × 900 | HC PAPER (PHOTOGRAPH), PLAIN PAPER, POSTCARD |
| 300 | 300 | 6 | 540000 | 600 × 900 | HC MATTE, HIGH GRADE PAPER 1 |
| 300 | 300 | 7 | 630000 | 600 × 1200 | INKJET POSTCARD, HIGH GRADE PAPER 2 |

FIG.5

| RESOLUTION IN RIP PROCESS(dpi) | TYPE OF PRINTING PAPER |
|---|---|
| 600×1200 | HC PAPER, PLAIN PAPER, POSTCARD |
| 900×1200 | HIGH GRADEPAPER 1, HIGRADE PAPER 2 |

FIG.6

| RESOLUTION (MAIN × SUB) | | NUMBER OF INK DROPS | AMOUNT OF DATA | RESOLUTION IN RIP PROCESS (dpi) | TYPE OF PRINTING PAPER |
|---|---|---|---|---|---|
| 300 | 600 | 1 | 180000 | 600 × 600 | |
| 300 | 600 | 2 | 360000 | 600 × 600 | |
| 300 | 600 | 3 | 540000 | 600 × 900 | |
| 300 | 600 | 4 | 720000 | 600 × 1200 | HC PAPER, PLAIN PAPER, POSTCARD |
| 300 | 600 | 5 | 900000 | 900 × 1200 | HIGH GRADE PAPER 1, HIGH GRADE PAPER 2 |
| 300 | 600 | 6 | 1080000 | 900 × 1200 | |
| 300 | 600 | 7 | 1260000 | 1200 × 1200 | |

CHARACTER WITHOUT SMOOTHING PROCESSING

CHARACTER WITH SMOOTHING PROCESSING ized by varying the number of ink drops to be discharged for each pixel in the range from 0 to 7, the irregularity on the edge portion of a character may be obscured in the following manner. That is, calculating the density levels using the oversampling method described above, and generating pixel values of eight gradations based on the density levels, and forming dots by varying the number of ink drops in eight steps based on the pixel values of eight gradations, and thereby arranging intermediate density dots on the edge portion of the character (FIG. 8B).

IMAGE PROCESSING METHOD AND APPARATUS COMPRISING AN IMAGE PROCESSING IN WHICH A RIP PROCESS IS PERFORMED ON ORIGINAL IMAGE DATA

CROSS-REFERENCE TO RELATED APPLICATIONS

This application is based upon and claims the benefit of priority from the prior Japanese Patent Application No. 2005-329456, filed Nov. 14, 2005, the entire contents of which incorporated herein by reference.

BACKGROUND OF THE INVENTION

1. Field of the Invention

The present invention relates to an image processing method and apparatus in which a RIP process is performed on original image data to obtain raster data, and a smoothing process is performed through oversampling the obtained raster data to generate output image data.

2. Description of the Related Art

Image forming methods for forming a color image using an inkjet recording device are proposed. In the method, a color image is formed through the steps of: creating original image data including graphics, such as characters, illustrations, and the like, using a computer; outputting the original image data in PDL format (page description language) from the computer; performing a RIP process on the original image data in PDL format to create raster data of C (cyan), M (magenta), Y (yellow), and K (black) components; and forming the color image using an inkjet recording device based on the obtained raster data.

Here, when forming a character "A" based on the raster data created in the manner as described above, the edge portion of the character becomes irregular depending on the size of the dots (resolution) as shown in FIG. 8A.

Consequently, for inkjet recording devices having capabilities of multi-gradation representation, methods for obscuring the aforementioned irregularity are proposed as described for example, in Japanese Unexamined Patent Publication Nos. 11 (1999)-69163, 10 (1998)-336454, 5 (1993)-233792, 9 (1997)-149242, and 2001-105663. In such methods, for example, a smoothing process is performed, using an oversampling method or the like, on the raster data to generate intermediate density data, thereby obscuring the irregularity. The referent of "oversampling method" as used herein means a method in which high resolution raster data are divided into pixel groups, each pixel group including n×n pixels, and output image data are generated with the average density of each pixel group as the density of each pixel in output image.

More specifically, for example, in an inkjet recording device having capabilities of eight-gradation (8 level) representation per pixel by varying the number of ink drops to be discharged for each pixel in the range from 0 to 7, the irregularity on the edge portion of a character may be obscured in the following manner. That is, calculating the density levels using the oversampling method described above, and generating pixel values of eight gradations based on the density levels, and forming dots by varying the number of ink drops in eight steps based on the pixel values of eight gradations, and thereby arranging intermediate density dots on the edge portion of the character (FIG. 8B).

Here, for example, when generating output image data to be inputted to an inkjet recording device with an output resolution of 300×300 dpi and an output gradation value of eight by performing the oversampling described above, it has been customary to perform a RIP process on the original image data to obtain raster data with a resolution of, for example, 900×900 dpi, and to perform oversampling by dividing the raster data with the resolution of 900×900 dpi into pixel groups of 3×3 pixels to generate output image data. Here each pixel group corresponds to each pixel in output image.

Even if the number of ink drops is varied in eight steps, however, there may be a case, depending on the type of printing paper, in which the density of the dots is not represented in eight steps due to ink sheering, ink holding capacity, or ink bleeding of the printing paper. Thus, for example, generation of raster data that enable the density representation of dots in eight steps for printing paper that support the density representation of dots only in five steps (including white dots) results in that some of the data are wasted.

More specifically, in a case where the printing paper may support the density representation of dots only in five steps (including white dots), and output image data with a resolution of 300×300 dpi are to be obtained, the amount of data required is 300×300×4 (number of drops)=360000, and not more. The referent of "amount of data" as used herein means the number of gradations per unit area. Here, the amount of data is expressed in the number of gradations per square inch as an example.

That is, the RIP process needs to be performed only to obtain the raster data of two gradations with a resolution of 600×600 dpi. Thus, performance of the RIP process to obtain the raster data with a resolution of 900×900 dpi as in the conventional manner causes the RIP process time unnecessarily long. Further, the data to be processed becomes voluminous, and subsequent data processing for the raster data is also caused unnecessarily long.

SUMMARY OF THE INVENTION

It is an object of the present invention to provide an image processing method and apparatus, in which a RIP process is performed on original image data to obtain raster data, and a smoothing process is performed through oversampling the obtained raster data to generate output image data as described above, which is capable of performing the RIP process and subsequent data processing in a more efficient way.

The image processing method of the present invention is a method in which a RIP process is performed on original image data to obtain raster data with a first resolution, and a smoothing process is performed through oversampling the obtained raster data to generate output image data with a second resolution which is smaller than the first resolution. The method is performed for recording an image on a recording medium by an inkjet recording device that performs the recording by discharging an ink drop on the recording medium from an inkjet head based on the output image data. Here, the first resolution in the RIP process for performing the smoothing process on the raster data is determined according to information that indicates the number of gradations corresponding to the number of ink drops selected in advance and the second resolution.

In the image processing method of the present invention described above, the information that indicates the number of gradations may be the type of the recording medium.

The image processing apparatus of the present invention is an apparatus including: a RIP processing section that performs a RIP process on original image data to obtain raster data with a first resolution; and a smoothing section that performs a smoothing process through oversampling the obtained raster data to generate output image data with a second resolution which is smaller than the first resolution. The apparatus is used for recording an image on a recording medium by an inkjet recording device that performs the recording by discharging an ink drop on the recording medium from an inkjet head based on the output image data. Here, the first resolution in the RIP process for performing the smoothing process on the raster data is determined according to information that indicates the number of gradations corresponding to the number of ink drops selected in advance and the second resolution.

In the image processing apparatus of the present invention described above, the information that indicates the number of gradations may be the type of the recording medium.

Here, the referent of "information that indicates the number of gradations" may be the information of the number of gradations itself, or information that indirectly indicates the number of gradations, such as the number of ink drops.

According to the image processing method and apparatus of the present invention, the first resolution in the RIP process is varied according to the information that indicates the number of gradations corresponding to the number of ink drops selected in advance (e.g., the number of gradations corresponding to the number of ink drops that may be supported by the recording medium) and the second resolution. This enables the first resolution in the RIP process to be dropped when the amount of data (number of gradations per unit area) obtained from the information indicating the number of gradations and the second resolution described above is small. Thereby, data processing needs to be performed only on the data required for image representation on the recording medium. Consequently, there will be no case in which the burden on the processing of data unnecessary for image representation on a recording medium becomes excessively large as in the conventional technology, which enables more efficient RIP processing and subsequent data processing.

BRIEF DESCRIPTION OF THE DRAWINGS

FIG. 2 is a drawing illustrating the correspondence relationship between the resolution in the RIP process and the type of printing paper.

FIGS. 3A to 3C are drawings for explaining oversampling.

FIG. 4 is a drawing illustrating the relationship among the type of printing paper, number of ink drops corresponding to the density that may be supported by the printing paper, amount of data required for representing each dot with the density that corresponds to the number of ink drops, and the resolution in the RIP process corresponding to the amount of data.

FIG. 5 is a drawing illustrating the correspondence relationship between the resolution in the RIP process and type of printing paper.

FIG. 6 is a drawing illustrating the relationship among the type of printing paper, number of ink drops corresponding to the density that may be supported by the printing paper, amount of data required for representing each dot with the density corresponding to the number of ink drops, and the resolution in the RIP process corresponding to the amount of data.

DESCRIPTION OF THE PREFERRED EMBODIMENTS

Figure 1:
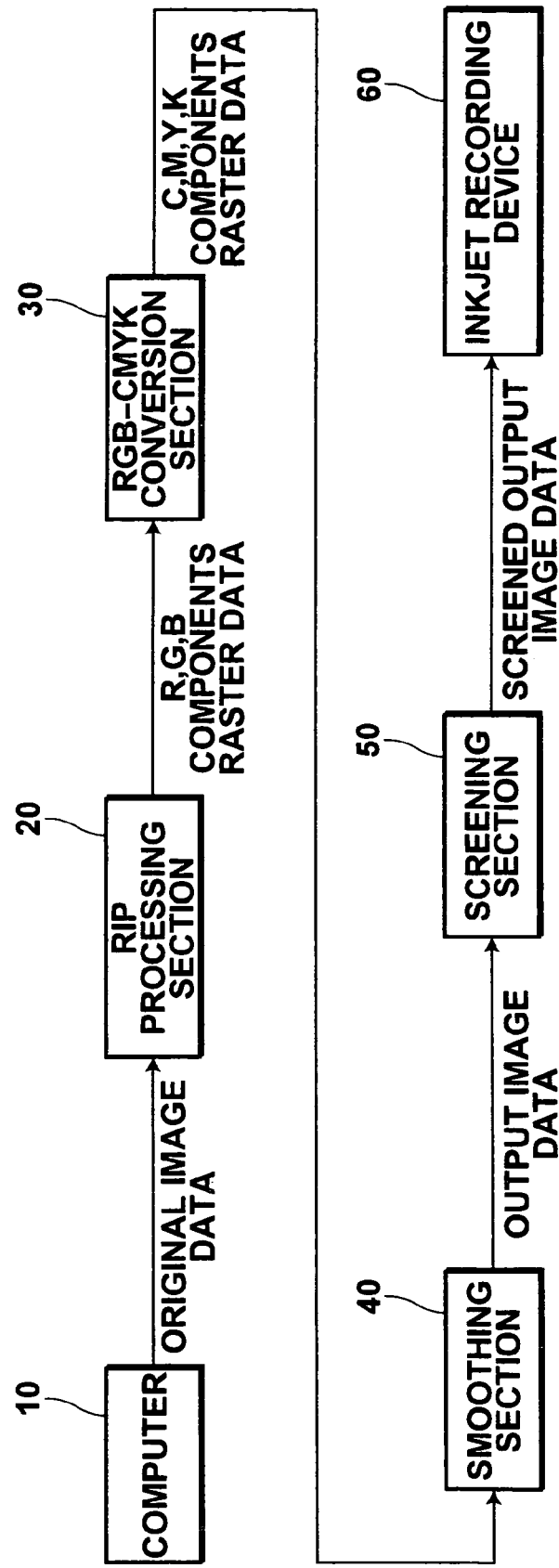
FIG. 1 is a block diagram of an inkjet recording system that employs an embodiment of the image processing apparatus of the present invention, illustrating the schematic structure thereof.
Figure 7:
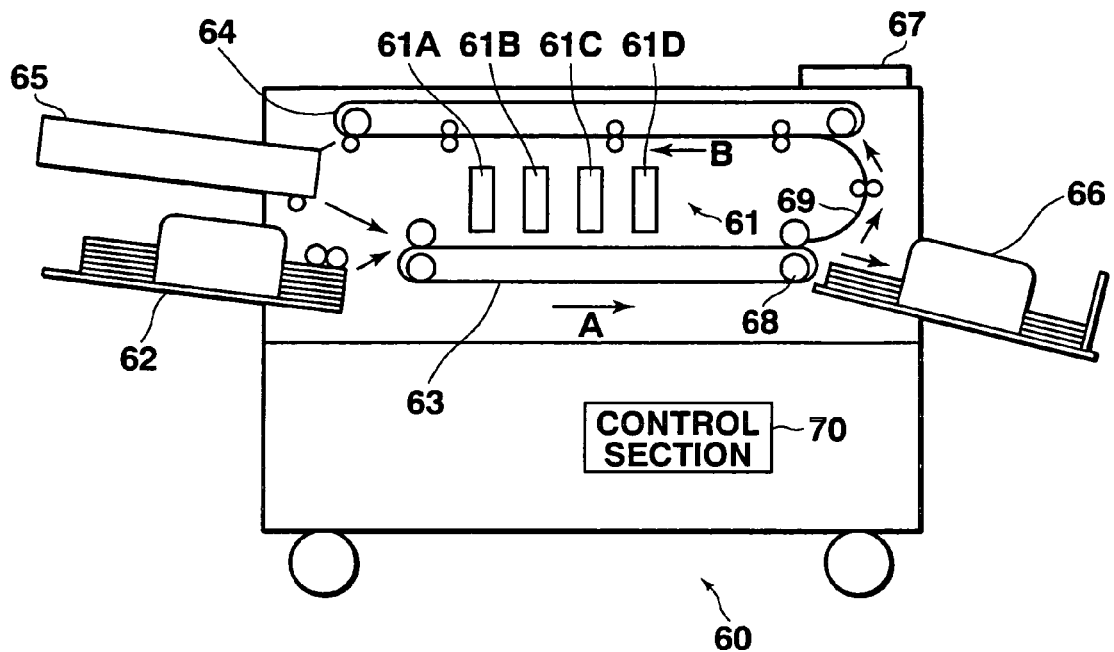
FIG. 7 is a schematic view of the inkjet recording device.
Figure 8A:
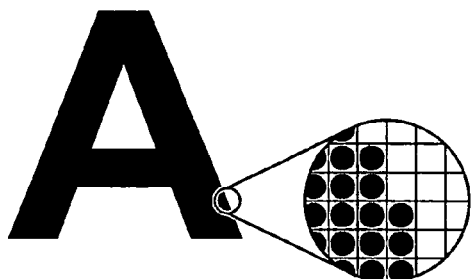
FIG. 8A is a drawing illustrating the edge portion of a character when the smoothing process is not performed.
Figure 8B:
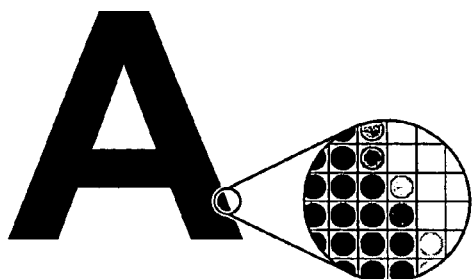
FIG. 8B is a drawing illustrating, the edge portion of a character when the smoothing process is performed.

Hereinafter, an inkjet recording system that employs an embodiment of the image processing method and apparatus of the present invention will be described in detail with reference to accompanying drawings. FIG. 1 is a block diagram of the inkjet recording system, illustrating the schematic structure thereof.

As shown in FIG. 1, the inkjet recording system includes: a computer 10 having installed therein an application capable of creating original image data including characters, photographs, illustrations, and the like, and outputting the original image data in PDL (page description language) format; a RIP processing section 20 that accepts the original image data outputted from the computer 10, and generates raster data of R, G, and B components by performing a RIP process on the original image data; and a RGB-CMYK conversion section 30 that converts the raster data of R, G and B components generated in the RIP processing section 20 to the raster data of C, M, Y and K components. The inkjet recording system further includes: a smoothing section 40 that performs a smoothing process through oversampling the raster data of C, M, Y and K components converted in the RGB-CMYK conversion section 30 to generate output image data of the respective components; a screening section 50 that performs a screening process on the output image data of the respective components generated in the smoothing section 40 to generate screened output image data of the respective components; and an inkjet recording device 60 that records an image based on the screened output data of the respective components generated in the screening section 50.

Operation of the inkjet recording system will now be described.

First, original image data including characters, photographs, illustrations, and the like are created by the application in the computer 10. Then, the type of printing paper for recording an image representing the original image data is selected by the application in the computer 10 and printing instruction is issued therefrom.

The computer 10 outputs the original image data in PLD format, and also outputs information of the type of printing paper to the RIP processing section 20 in response to the printing instruction.

Here, note that the correspondence relationship between the type of printing paper and the resolution in the RIP process, like that shown in FIG. 2, is preset in the RIP processing section 20. The RIP processing section 20 determines the resolution in the RIP process based on the correspondence relationship shown in FIG. 2 and inputted information of the type of printing paper, and performs the RIP process on the original image data in PDL format to generate raster data. As described above, the ink holding capacity and ink bleeding vary depending on the type of printing paper, and hence possible dot densities (which, for example, correspond to the number of gradations) also differ. The resolution required for the RIP process is related to the possible dot densities, to be described later. Therefore, the resolution in the RIP process varies according to the type of printing paper as described above.

For example, if the printing paper is HC paper (character), a resolution of 600×600 dpi is obtained as the resolution in the RIP process from the correspondence relationship, and the RIP process is performed on the original image data so that the raster data with that resolution are generated. Further, for example, if the printing paper is HC paper (photograph), a resolution of 600×900 dpi is obtained as the resolution in the RIP process from the correspondence relationship, and the RIP process is performed on the original image data so that the raster data with that resolution are generated. Still further, for example, if the printing paper is an inkjet postcard, a resolution of 600×1200 dpi is obtained as the resolution of the RIP processing from the correspondence relationship, and the RIP process is performed on the original image data so that the raster data with that resolution are generated. Determination of the resolution required for the RIP process will be described later.

Then, the RIP processing section 20 generates raster data of R, G, and B components by performing the RIP process on the original image data as described above. Each of the pixel data sets of the raster data of R, G, and B components is a data set represented, for example, by 8-bits.

The raster data of R, G, and B components generated in the RIP processing section 20 are outputted to the RGB-CMYK conversion section 30, where they are converted to the raster data of C, M, Y, and K components. Each of the pixel data sets of the raster data of C, M, Y, and K components is also a data set represented, for example, by 8-bits.

The raster data of C, M, Y, and K components generated in the RGB-CMYK conversion section 30 are outputted to the smoothing section 40, where the respective raster data are oversampled, and output image data with a resolution of 300×300 dpi are generated.

The referent of "oversampling" as used herein means that high resolution input image data are divided into pixel groups of n×n pixels, and output image data are generated with the average density of each pixel group as the density of each pixel in output image. For example, when generating output image data with a resolution of 300×300 dpi through oversampling the raster data with a resolution of 900×900 dpi (substantially, binary data of "0" and "255" for character data), the raster data of 900×900 dpi are divided into pixel groups P of 3×3 pixels as shown in FIG. 3A, then the average density value of each pixel group is calculated as shown in FIG. 3B, and the output image data of 300×300 dpi are obtained with the average density value of each pixel group as the density of each pixel in the same image area as shown in FIG. 3C. In the present embodiment, the resolution of the raster data after RIP processing is 300×300 dpi, 600×900 dpi, or 600×1200 dpi, so that the pixels are grouped into 2×2 pixels, 2×3 pixels, or 2×4 pixels. The subsequent processing is the same.

Thereafter, the output image data generated for the respective components in the manner as described above are outputted to the screening section 50. In the screening section 50, the screening process is performed on the output image data of the respective components by taking into account the predetermined number of gradations. As for the screening process, for example, half toning or error diffusion algorithm is performed. The referent of "predetermined number of gradations" as used herein means the number of gradations corresponding to the number of ink drops that corresponds to the maximum possible density of the printing paper. In the present embodiment, the correspondence relationship between the type of printing paper and the number of gradations is preset, and the number of gradations is determined based on the type of printing paper selected in the computer 10.

The screening process described above is performed such that the each of the dots is represented with the density within the number of gradations described above. For example, if the determined number of gradations is eight, each pixel data set of the respective screened output image data is converted to 3-bit data.

Then, the screened output image data of the respective components generated in the manner as described above are outputted to the inkjet recording device 60, where an image is recorded by discharging ink from the recording head of each of the components based on the screened output image data of the respective components. For example, if the screened output image data are the data representing eight gradations, the image is recorded by discharging ink on the printing paper from each recording head with the dot densities of 0 to 7 drops. Image recording in the inkjet recording device will be detained later.

The method for determining the resolution required for the RIP process will now be described.

As described above, ink holding capacity, ink bleeding, or ink sheering differs depending on the type of printing paper, and hence maximum possible dot density also differs. Generally, a quality image may be obtained by the inkjet recording device, when the image is printed on printing paper having a high ink holding capacity with less ink bleeding and ink sheering by a large number of ink drops, since the image may have the highest density and gradations in this case. For example, in the inkjet recording device that may obtain a printed image of the highest quality using for example, thick matte paper, the image is printed in eight gradations of 0 to 7 drops. Here, if the output image data are to be obtained with a resolution of 300×300 dpi, and each dot density is to be represented by up to 7 drops, the required amount of data is 300×300×7=360000 per square inch. In the oversampling method, resolution setting for generating an amount of data which is equivalent to the aforementioned amount of data is required.

For certain printing paper, however, there may be a case in which representation with the density of four drops is optimum, and discharging of more ink drops does not produce the optimum image due to ink bleeding, ink sheering, or the like. Here, if output image data with a resolution of 300×300 dpi, and each dot is represented by up to 4 drops, the amount of data required is 300×300×4=360000 per square inch. In the oversampling method, resolution setting for generating an amount of data which is equivalent to the aforementioned amount of data is required. That is, in the case of n-gradations, the maximum number of drops described above is equal to n−1. Therefore, in the present embodiment, the aforementioned amount of data is obtained from the resolution of the output image data and the maximum number of drops as an example.

That is, the amount of output image data required after smoothing processing (sufficient amount of data for generating the output image data that enable representation with the density of predetermined number of drops corresponding to the type of printing paper with the resolution of 300×300 dpi) is 300×300×4=360000. Thus, the sufficient amount of raster data required prior to smoothing processing, i.e., the raster data required after RIP processing is 360000, so that the RIP process may be performed with a resolution of 600×600 dpi. More specifically, for the amount of character data required for the smoothing process is 600×600×1 (number of drops) =360000, since the character data are substantially two gradation data, and this amount of data is sufficient for performing the smoothing process on the character region. Therefore, the resolution of the raster data with a high resolution required for oversampling is determined according to the resolution (e.g., 300×300 dpi) and the number of gradations (e.g., 4 drops) of the output image data.

Conversely, it may be said that performance of the RIP process with a resolution higher than 600×600 dpi, for example, with 900×900 dpi only results in the increase in the amount of data without changing the density representation of the image.

FIG. 4 illustrates the relationship among the type of printing paper, number of ink drops corresponding to the maximum density that may be supported by the printing paper, amount of data required for representing each dot with the density that corresponds to the number of ink drops, and resolution in the RIP process corresponding to the amount of data. Here, the resolution of the output image data is 300×300 dpi.

As shown in FIG. 4, if, for example, HC paper (character) is selected as the type of printing paper, the amount of data required for the output image data is 300×300×4=360000, since the number of ink drops that may be supported by the HC paper (character) is four. Accordingly, presence of data with a resolution of 600×600 dpi (amount of data of 600×600×1=360000) prior to smoothing processing is sufficient for performing the smoothing process on the character region and generating output image data that enables density representation corresponding to the type of printing paper. Therefore, the RIP process may be performed with a resolution of 360000=600×600 dpi. Thus, the resolution in the RIP process is determined according the number of ink drops that may be supported by the printing paper and the resolution of the output image data.

For example, if HC paper (photograph) is selected as the type of printing paper, the amount of data required for the output image data is 300×300×5=450000, since the number of ink drops that may be supported by the HC paper (photograph) is five. Accordingly, minimum amount of raster data required after RIP processing is 450000. Thus, the RIP process may be performed, for example, with a resolution of 540000=600×900 dpi.

Further, for example, if HC matte is selected as the type of printing paper, the amount of data required for the output image data is 300×300×6=540000, since the number of ink drops that may be supported by the HC paper (photograph) is six. Accordingly, minimum amount of raster data required after RIP processing is 540000. Thus, the RIP process may be performed, for example, with a resolution of 540000=600×900 dpi.

Still further, for example, if an inkjet postcard is selected as the type of printing paper, the amount of data required for the output image data is 300×300×7=630000 (dpi), since the number of ink drops that may be supported by the inkjet postcard is seven. Accordingly, the minimum amount of raster data required after RIP processing is 630000. Thus, the RIP process may be performed, for example, with a resolution of 720000=600×1200 dpi.

Other types of printing paper may be entered in the blank columns in FIG. 4.

So far the description has been made of a case in which the output image data with a resolution of 300×300 dpi are obtained. But the present invention is not limited to this, and output image data with a resolution of, for example, 300×600 dpi may be obtained. In this case, the correspondence relationship between the type of printing paper and the resolution in the RIP process like that shown in FIG. 5 may be preset in the RIP processing section 20. FIG. 6 illustrates the relationship among the type of printing paper, number of ink drops corresponding to the density that may be supported by the printing paper, amount of data required for representing each dot with the density that corresponds to the number of ink drops, and resolution in the RIP process corresponding to the amount of data.

As shown in FIG. 6, if, for example, HC paper is selected as the type of printing paper, the amount of data required for the output image data is 300×600×4=720000 (dpi), since the number of ink drops that may be supported by the HC paper is four. Accordingly, the RIP process may be performed with a resolution of 720000=600×1200 dpi.

Further, for example, if high grade paper 1 is selected as the type of printing paper, the amount of data required for the output image data is 300×600×5=900000 (dpi), since the number of ink drops that may be supported by the high grade paper 1 is five. Accordingly, the minimum amount of raster data required after RIP processing is 900000. Therefore, the RIP process may be performed with a resolution of, for example, 1080000=900×1200 dpi.

Other types of printing paper may be entered in the blank columns in FIG. 6.

In the embodiment described above, the description has been made of a case in which the oversampling is performed throughout raster data. Alternatively, for example, a character region in the raster data is discriminated first, and then the oversampling may be performed only on the discriminated character region. Still further, binarization is performed on the raster data of the character region prior to performing the oversampling, and then performing the oversampling on the binarized raster data of the character region.

The inkjet recording device 60 of the inkjet recording system will now be described briefly.

The inkjet recording device 60 includes: a control section 70 that generates control signals based on the screened output image data of the respective components outputted from the screening section 50; an inkjet head unit 61 that records an image by discharging ink on printing paper based on the control signals from the control section 70; a paper feeder 62 on which printing paper is stacked; a belt conveyor 63 that conveys the printing paper paid out from the paper feeder 62 to the inkjet head unit 61; a duplex printing belt conveyor 64 that conveys the printing paper when duplex printing is performed; a duplex printing stack tray 65 that tentatively receives the printing paper printed on one side when duplex printing is performed; a catch tray 66 that receives the printing paper conveyed by the belt conveyor 63 and recorded with an image thereon by the inkjet head unit 61; and a touch panel 67 form which predetermined printing conditions may be entered.

The inkjet head unit 61 includes recording heads 61A to 61D corresponding to the screened output image data of Y, M, C, and K components respectively.

The belt conveyor 63 is formed of an endless belt that has multitudes of holes provided therethrough and sucks printing paper thereon by the negative pressure developed by a sucking fan (not shown) which sucks the air through the holes, thereby conveying the printing paper in the arrow A direction.

The duplex printing belt conveyor 64 is formed of an endless belt that has multitudes of holes provided therethrough, as in the belt conveyor 63, and conveys printing paper printed on one side to the duplex printing stack tray 65 and discharge the printing paper thereon.

The duplex printing stack tray 65 tentatively stacks printing paper printed on one side and conveyed by the duplex printing belt conveyor 64, and pays out the stacked printing paper printed on one side to the belt conveyor 63 in the order of stacking such that printing is performed on the rear side of the printing paper.

Next, operation of the inkjet recording device 60 will be described.

Printing paper stacked on the paper feeder 62 is put on the belt conveyor 63 and conveyed by the belt conveyor 63 in the arrow A direction at a predetermined constant speed, thereby conveyed to a place adjacent to the inkjet head unit 61. Then, an image is recorded on the printing paper conveyed by the belt conveyor 63 by discharging inks from the recording heads 61A to 61D based on the control signals outputted from the control section 70. In the case of single-sided printing, the printing paper on which the image is recorded in the manner as described above is discharged on the catch tray 66. In the case of duplex printing, the printing paper with the image recorded on one side in the manner as described above is clamped by a pair of rollers 68 and put on a conveying path 69. The printing paper printed on one side and put on the conveying path 69 is further clamped by a pair of rollers 70 and conveyed to the duplex printing belt conveyor 64. The duplex printing belt conveyor 64 conveys the printing paper printed on one side in the arrow B direction with the side on which the image is recorded facing downward, and the printing paper printed on one side is discharged on the duplex printing stack tray 65 with the side on which the image is recorded facing downward. The printing paper printed on one side and discharged on the duplex printing stack tray 65 is picked up by a pickup roller (not shown) and paid out to the belt conveyor 64 from the bottom side of the duplex printing stack tray 65. Then an image is recorded on the rear side of the printing paper in the similar manner as in the single-sided printing. In the case of the rear side printing, however, it is necessary to align the orientation of the image with that of the front image. Therefore, the image recording on the rear side is performed based on the screened output image data rotated by 180 degrees. In the embodiment described above, the description has been made of a case in which the issuance of printing instruction and selection of the type of printing paper are implemented by the computer 10. Alternatively, the issuance of printing instruction and selection of the type of printing paper are implemented through the touch panel 67 of the inkjet recording device 60, and information of the type of printing paper is outputted to the RIP processing section 20 from the inkjet recording device 60.

Further, in the embodiment described above, the description has been made of a case in which the type of printing paper is selected, and the RIP process is performed with a resolution that corresponds to the type of printing paper. Alternatively, the number of ink drops corresponding to the possible density or the number of gradations that may be supported by the printing paper may be selected directly, instead of selecting the type of printing paper.

What is claimed is:

1. An image processing method in which a RIP process is performed on original image data to obtain raster data with a first resolution, and a smoothing process is performed through oversampling the obtained raster data to generate output image data with a second resolution which is smaller than the first resolution, the method being performed for recording an image on a recording medium by an inkjet recording device that performs the recording by discharging an ink drop on the recording medium from an inkjet head based on the output image data, wherein a plurality of pieces of information each represent a number of gradations corresponding to the number of ink drops selected in advance, the method further comprising:

receiving a selection of one of the pieces of information representing a number of gradation; and determining the first resolution in the RIP process based on the selected piece of information representing the number of gradation, and the second resolution.

2. The image processing method according to claim 1, wherein the information that indicates the number of gradations is the type of the recording medium.

3. The image processing method according to claim 1, wherein the relationship between the first resolution and the second resolution satisfy the formula:

$$\text{second resolution} \times \text{selected number of ink drops} \leq \text{first resolution}.$$

4. The image processing method according to claim 1, further comprising:

setting in advance a plurality of resolutions as candidates for the first resolution; and determining the first resolution as a resolution which is closest to a value obtained by multiplying the second resolution and selected number of ink drops from among the plurality of resolutions.

5. An image processing apparatus comprising: a RIP processing section that performs a RIP process on original image data to obtain raster data with a first resolution; and a smoothing section that performs a smoothing process through oversampling the obtained raster data to generate output image data with a second resolution which is smaller than the first resolution, the apparatus being used for recording an image on a recording medium by an inkjet recording device that performs the recording by discharging ink drops on the recording medium from an inkjet head based on the output image data, wherein a plurality of pieces of information each represents a number of gradations corresponding to the number of ink drops set in advance in the RIP processing station;

the apparatus receives a selection of one of the pieces of information representing the number of gradation; and the apparatus determines the first resolution in the RIP process based on the selected piece of information representing the number of gradation and the second resolution.

6. The image processing apparatus according to claim 5, wherein the information that indicates the number of gradations is the type of the recording medium.

7. The image processing apparatus according to claim 5, wherein the relationship between the first resolution and the second resolution satisfy the formula:

$$\text{second resolution} \times \text{selected number of ink drops} \leq \text{first resolution}.$$

8. The image processing apparatus according to claim 5, wherein:

the RIP processing section sets in advance a plurality of resolutions as candidates for the first resolution; and the apparatus determines the first resolution as a resolution which is closest to a value obtained by multiplying the second resolution and selected number of ink drops from among the plurality of resolutions.

* * * * *